(12) United States Patent
Sarkar et al.

(10) Patent No.: US 7,694,180 B2
(45) Date of Patent: Apr. 6, 2010

(54) COLLECTING DEBUG INFORMATION ACCORDING TO USER-DRIVEN CONDITIONS

(75) Inventors: Shantanu Sarkar, San Jose, CA (US); Shing-Kun Kuo, San Jose, CA (US); Randall Paul Joseph Ethier, Burke, VA (US)

(73) Assignee: Cisco Technology, Inc., San Jose, CA (US)

( * ) Notice: Subject to any disclaimer, the term of this patent is extended or adjusted under 35 U.S.C. 154(b) by 567 days.

(21) Appl. No.: 11/324,115

(22) Filed: Dec. 30, 2005

(65) Prior Publication Data
US 2007/0174707 A1    Jul. 26, 2007

(51) Int. Cl.
*G06F 15/173* (2006.01)
(52) U.S. Cl. .............................. 714/37; 714/26; 714/46; 709/224; 370/252; 370/214; 379/32.01
(58) Field of Classification Search .................... 714/25, 714/26, 47, 46, 37
See application file for complete search history.

(56) References Cited

U.S. PATENT DOCUMENTS

| | | | | |
|---|---|---|---|---|
| 5,333,302 A * | 7/1994 | Hensley et al. ................. | 714/37 |
| 5,490,204 A * | 2/1996 | Gulledge .................... | 455/423 |
| 5,822,401 A * | 10/1998 | Cave et al. ................ | 379/32.02 |
| 5,930,344 A * | 7/1999 | Relyea et al. ................ | 379/126 |
| 6,917,587 B1 * | 7/2005 | Sarkar et al. ................ | 370/230 |
| 7,042,998 B2 * | 5/2006 | Zino et al. ................ | 379/220.01 |
| 7,231,212 B2 * | 6/2007 | Arazi et al. .................. | 455/436 |
| 2001/0043568 A1 * | 11/2001 | Mchale et al. .............. | 370/254 |
| 2002/0042826 A1 * | 4/2002 | Gaus et al. .................. | 709/227 |
| 2002/0122429 A1 * | 9/2002 | Griggs ....................... | 370/401 |
| 2004/0042606 A1 * | 3/2004 | Zino et al. ............. | 379/220.01 |
| 2004/0071084 A1 * | 4/2004 | El-Hennawey et al. ...... | 370/230 |
| 2004/0073641 A1 * | 4/2004 | Minhazuddin et al. ...... | 709/223 |
| 2004/0073658 A1 * | 4/2004 | Oran et al. .................. | 709/224 |
| 2004/0139305 A1 * | 7/2004 | Arimilli et al. .............. | 712/227 |
| 2004/0261115 A1 * | 12/2004 | Bartfeld ...................... | 725/106 |
| 2005/0125199 A1 * | 6/2005 | Slaight ....................... | 702/186 |
| 2005/0273765 A1 * | 12/2005 | Arnold et al. ............... | 717/129 |
| 2005/0276386 A1 * | 12/2005 | Ethier et al. ............. | 379/32.05 |
| 2006/0187851 A1 * | 8/2006 | Waldorf et al. .............. | 370/252 |
| 2007/0061628 A1 * | 3/2007 | Bradbury et al. .............. | 714/39 |

OTHER PUBLICATIONS

U.S. Appl. No. 10/868,982 entitled, "*System and Method for End-To-End Communications Tracing*", 106 pages specification, claims and abstract, 4 pages of drawings, inventors Randall P. J. Ethier, et al.

(Continued)

*Primary Examiner*—Scott T Baderman
*Assistant Examiner*—Chae Ko
(74) *Attorney, Agent, or Firm*—Baker Botts L.L.P.

(57) ABSTRACT

Collecting debug information includes facilitating a communication session for an endpoint operated by a user. One or more user-driven conditions are monitored, where a user-driven condition results from an action by the user. Data is gathered during the monitoring. Whether the communication session is satisfactory or unsatisfactory is determined from the one or more user-driven conditions. Monitoring is discontinued if the communication session is satisfactory, and debug information is generated from the gathered data if the communication session is unsatisfactory.

21 Claims, 1 Drawing Sheet

OTHER PUBLICATIONS

"Digital cellular telecommunications system (Phase 2+); Telecommunication management; GSM subscriber and equipment trace (3GPP TS 52.008 version 6.0.0 Release 6)," ETSI TS 152 008 V6.0.0 , *European Telecommunications Standards Institute*, Dec. 2004, 58 pages.

"Universal Mobile Telecommunications System (UMTS); Telecommunication management; Subscriber and equipment trace; Trace concepts and requirements (3GPP TS 32.421 version 6.7.0 Release 6)," ETSI TS 132 142, *European Telecommunications Standards Institute*, Jun. 2005, 23 pages.

* cited by examiner

COLLECTING DEBUG INFORMATION ACCORDING TO USER-DRIVEN CONDITIONS

TECHNICAL FIELD

This invention relates generally to the field of telecommunications and more specifically to collecting debug information according to user-driven conditions.

BACKGROUND

Debug information may be collected in order to detect and analyze problems in a communication system. According to some known techniques for collecting debug information, debug information is collected for at least nearly all communication sessions. These known techniques, however, require large amounts of memory and generally decrease performance. Moreover, the majority of the collected data typically is not related to a problem.

According to other known techniques for collecting debug information, debug information is collected for a call after a problem with the call has been detected. These known techniques, however, typically require the use of a system administrator or custom support engineer to initiate the collection. Moreover, informative debug information may occur before the problem is detected and thus before the information is collected.

SUMMARY OF THE DISCLOSURE

In accordance with the present invention, disadvantages and problems associated with previous techniques for collecting debug information may be reduced or eliminated.

According to one embodiment of the present invention, collecting debug information includes facilitating a communication session for an endpoint operated by a user. One or more user-driven conditions are monitored, where a user-driven condition results from an action by the user. Data is gathered during the monitoring. Whether the communication session is satisfactory or unsatisfactory is determined from the one or more user-driven conditions. Monitoring is discontinued if the communication session is satisfactory, and debug information is generated from the gathered data if the communication session is unsatisfactory.

Certain embodiments of the invention may provide one or more technical advantages. A technical advantage of one embodiment may be that a communication session is monitored until the communication session is designated as satisfactory. Monitoring a communication session until it is designated as satisfactory may reduce collection of uninformative debug information collected while increasing collection of informative debug information.

Another technical advantage of one embodiment may be that the debug information is collected by marking specific call control data. Call control data is collected for every communication session for call control purposes, so collecting debug information from the call control data does not involve collecting additional data for debug purposes.

Another technical advantage of one embodiment may be that a communication session may be designated as satisfactory according to user-driven conditions resulting from user actions. Since the user is an effective judge of the quality of a communication session, user-driven conditions may better reflect the quality of a communication session.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
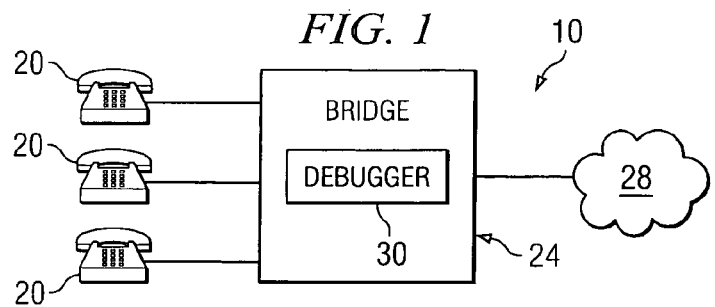
FIG. 1 is a block diagram illustrating one embodiment of system for which debug information may be collected.
Figure 2:
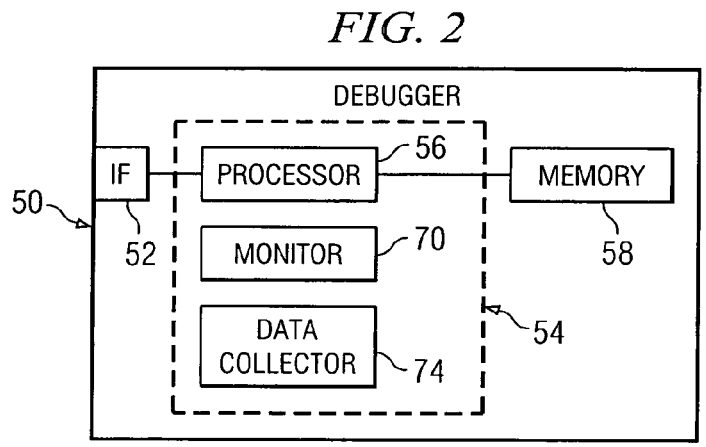
FIG. 2 is a block diagram illustrating one embodiment of a debugger operable to collect debug information that may be used with the system of FIG. 1.
Figure 3:
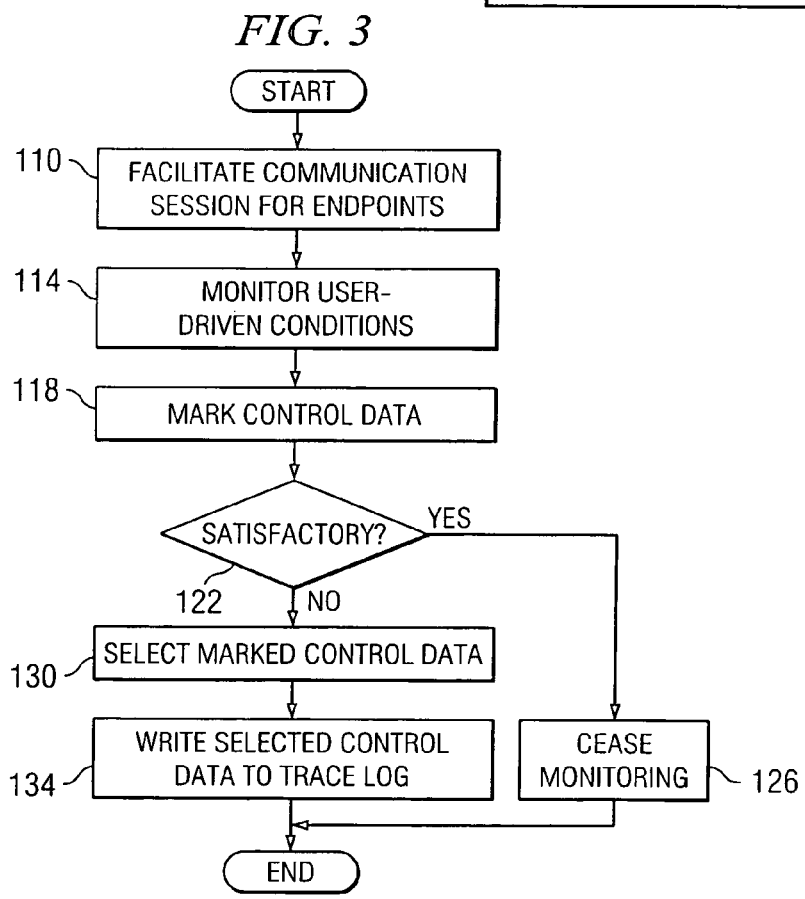
FIG. 3 is a flowchart illustrating one embodiment of a method for collecting debug information that may be used with the debugger of FIG. 2.

Embodiments of the present invention and its advantages are best understood by referring to FIGS. 1 through 3 of the drawings, like numerals being used for like and corresponding parts of the various drawings.

FIG. 1 is a block diagram illustrating one embodiment of system for which debug information may be collected. According to the embodiment, a communication session may be monitored to collect debug information. The debug information may be collected by marking specific call control data. The communication session may be monitored until the communication session is designated as satisfactory according to user-driven conditions resulting from user actions. Only certain marked control data may be logged as debug information.

According to the illustrated embodiment, system 10 operates to provide services such as communication sessions to communication devices such as endpoints 20. A communication session may refer to an active communication between endpoints, measured from endpoint to endpoint. Information is communicated during a communication session. Information may refer to voice, data, text, audio, video, animation, multimedia, control, signaling, other information, or any combination of the preceding.

System 10 may communicate information in packets. A packet may comprise a bundle of data organized in a specific way for transmission, and a frame may comprise the payload of one or more packets organized in a specific way for transmission. A packet-based communication protocol such as Internet Protocol (IP) may be used to communicate the packets.

System 10 may utilize communication protocols and technologies to provide the communication sessions. Example communication protocols and technologies include those set by the Institute of Electrical and Electronics Engineers, Inc. (IEEE) 802.xx standards such as 802.11 and 802.16 standards, International Telecommunications Union (ITU-T) standards such as the H.323 protocols, European Telecommunications Standards Institute (ETSI) standards, Internet Engineering Task Force (IETF) standards such as the Session Initiation Protocol (SIP), or other standards.

System 10 includes components such as devices. In general, a device may include any suitable arrangement of components operable to perform the operations of the device, and may comprise logic, an interface, memory, other component, or any suitable combination of the preceding. "Logic" may refer to hardware, software, other logic, or any suitable combination of the preceding. Certain logic may manage the operation of a device, and may comprise, for example, a processor. "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

According to the illustrated embodiment, system 10 includes endpoints 20, a bridge 24, and communication networks 28 coupled as shown. Endpoint 20 represents any suitable device operable to communicate with a communication system. Endpoint 20 typically communicates by sending and receiving streams comprising packets of information. Endpoint 20 may comprise, for example, a personal digital assistant, a computer such as a laptop, a telephone, a cellular telephone, a mobile handset, or any other device operable to communicate with system 10. A user typically refers to a person or other entity, for example, an automated attendant, that operates endpoint 20.

Bridge 24 operates to send streams to and receive streams from endpoints 20. As an example, bridge 24 may comprise a conference bridge operable to provide a conference call to endpoints 20. A conference call refers to a communication session that has two or more endpoints participating in the communication session. A conference bridge mixes streams received from certain endpoints 20 and sends the mixed stream to certain endpoints 20. As another example, bridge 24 may comprise a contact center operable to maintain communication sessions from endpoints 20.

Bridge 24 includes a debugger 30 that monitors a communication session to collect debug information. Debug information may include any suitable information that may be used to detect and analyze problems with a communication session. The debug information may be collected by marking or enhancing specific call control data. The communication session may be monitored until the communication session is designated as satisfactory according to user-driven conditions resulting from user actions. Debugger 30 may select only certain marked control data to be retrieved as debug information. An example embodiment of debugger 30 is described in more detail with reference to FIG. 2.

Network 28 represents a communication network that allows devices such as endpoint 20 to communicate with other devices. A communication network may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

System 10 may include other suitable devices. As an example, system 10 may include a gateway. A gateway may comprise any suitable device operable to interconnect with a network, and may convert communications between different communication protocols. As another example, system 10 may include an authorization server. An authorization server may comprise any suitable device operable to provide authorization-related services such as authentication, authorization, accounting, or any suitable combination of the preceding.

One or more components of system 10 may operate on one or more computers and may include appropriate input devices, output devices, mass storage media, processors, memory, or other components for receiving, processing, storing, and communicating information according to the operation of system 10. As used in this document, the term "computer" refers to any suitable device operable to accept input, process the input according to predefined rules, and produce output, for example, a personal computer, work station, network computer, wireless telephone, personal digital assistant, one or more microprocessors within these or other devices, or any other suitable processing device.

Modifications, additions, or omissions may be made to system 10 without departing from the scope of the invention. The components of system 10 may be integrated or separated according to particular needs. Moreover, the operations of system 10 may be performed by more, fewer, or other modules. Additionally, operations of system 10 may be performed using any suitable logic. As used in this document, "each" refers to each member of a set or each member of a subset of a set.

FIG. 2 is a block diagram illustrating one embodiment of a debugger operable to collect debug information that may be used with the system of FIG. 1. According to the embodiment, debugger 50 monitors a communication session to collect debug information. The debug information may be collected by marking specific call control data. The communication session may be monitored until the communication session is designated as satisfactory according to user-driven conditions resulting from user actions. Debugger 50 may select only certain marked control data to be logged as debug information.

According to the illustrated embodiment, debugger includes an interface 52, logic 54 such as a processor 56, and a memory 58 coupled as shown. Interface 52, logic 54, processor 56, and memory 58 may be as described with reference to FIG. 1.

Logic 54 also includes a monitor 70 and a data collector 74. Monitor 70 monitors a communication session to collect debug information. According to one embodiment, monitor 70 monitors a communication session until the communication session is designated satisfactory. A communication session may be designated as satisfactory according to any suitable criteria.

According to one embodiment, a communication session may be designated as satisfactory according to user-driven conditions. User-driven conditions may refer to conditions resulting from a user action. A user action may refer to an action resulting from the user interacting with endpoint 20. For example, a user action may include a user selecting a selector of endpoint 20, for example, a button, menu item, or voice command. As an example, a user may press a button to initiate, pause, or terminate a communication session.

User-driven conditions may serve as an effective indicator of a problem, since a user may be an effective judge of the quality of a communication session. As an example, a communication session may be designated as satisfactory according to the call duration between the initiation of a communication session by a user and the termination of the communication session by the user. Termination may refer to successful session establishment or session release. Typically, a user who experiences a problem with a communication session is less likely to remain on the communication session, whereas a user who does not experience a problem is more likely to remain on the communication session. Accordingly, a longer call duration may be positively correlated with a higher probability of a satisfactory call. Call duration may be an efficient indicator for intermittent problems that happen randomly.

In an example, the call duration of a communication session for each endpoint may be monitored for any suitable interval, for example, less than fifteen seconds such as approximately ten or five seconds. If the call duration of a communication session is greater than the interval, the communication session is designated as satisfactory, and the communication session is no longer monitored. If the call duration of a communication session is less than the interval, the communication session is designated as unsatisfactory, and debug information is collected for the communication session.

A communication session may be designated as satisfactory according to any other suitable criteria. As another example, a monitoring device may monitor the audio quality of a communication session. The audio quality may be used to indicate whether a communication session is satisfactory.

Data collector 74 collects debug information. According to one embodiment, data collector 74 may collect the debug information by marking call control data while a communication session is monitored. If the communication session is designated as unsatisfactory, debug traces are generated from the marked call control data. If the communication session is designated as satisfactory, debug traces are not generated from the marked call control data.

According to the embodiment, call control data describes changes in events and states. Changes in call control data may be monitored for each endpoint 20. Call control data may include signaling information, routing information, state information, or other suitable information describing a communication session or system 10. Signaling information may describe signaling protocol, and may include protocol-specific information such as SIP or H.323 message contents. Routing information may describe packet routing, and may include, for example, RTP messages, point identifiers, security protocols, other information, or any suitable combination of the preceding. State information may describe the state of the communication session or a device of system 10, and may include, for example, information about the state of the protocol state machine or internal state of a digital signal processor of bridge 24.

The data selected to write to the logs may be selected in any suitable manner. According to one embodiment, the data may be selected in accordance with its relevance to the current stage of the communication session. Stages of a communication session may include initialization stages, stable stages, intermediate states, or other stage. An initialization stage may refer to the stage during which an endpoint 20 joins the conference. Endpoint 20 may join directly or through an interactive voice response (IVR) system. A stable stage may refer to the stage after endpoint 20 has joined the conference and media communication has been established. An intermediate stage may occur when an in-conference feature, such as a roll call or breakout session feature, is provided.

Certain information may be more relevant to certain stages of the communication session. As an example, if the communication session is at an initialization stage, signaling information, state information, and routing information may be selected. If the communication session is at a stable stage, packet statistics, such as Realtime Transport Protocol (RTP) packet statistics, and memory usage information may be selected. If the communication session is providing an in-conference feature, signaling information about the in-conference feature may be selected.

According to another embodiment, the data may be selected in accordance with diagnostic information. Diagnostic information may describe the results of a diagnostic procedure performed for the communication session. As an example, diagnostic information may include information about endpoint 20, such as the interfaces, resources, or routes used by endpoint 20. As another example, diagnostic information may include information about system 10, such as resource utilization. The diagnostic information may indicate problem areas, and data relevant to the problem areas may be selected.

According to another embodiment, the data may be selected in accordance with the impact of data logging on the system. As an example, if the CPU utilization is high, less data may be logged, but if the CPU utilization is low, more data may be logged. As another example, less data may be selected during a more heavily used time of day. As another example, an administrator may set thresholds on the amount of data collected, based on system requirements and traffic patterns.

Data collector 74 may deselect information that probably does not indicate a problem. As an example, the first endpoint to join a conference may drop out if no other endpoints 20 are in the conference. As another example, if a session has been connected and is in a stable state, information about call entry, for example, prompts played and keys pressed, may no longer be relevant.

According to one embodiment, data collector 74 may apply a filter to select certain marked call control data to write to trace logs as debug information. The filters may be configured to generate appropriate debug information. In certain circumstances, the filters may be dynamic, adjusting in response to the current state of system 10.

Call control data is typically collected during a call, so no additional memory may be needed to collect the debug information. According to one embodiment, the amount of memory for collecting call control data may be expressed by $N \times X + D$, where X represents the memory used to store the data changes, N represents the number of endpoints, and D represents a small amount of additional memory for storing data for new communication sessions while the data for existing communication sessions is being logged. As an example, if N=200, the total amount of memory may be approximately 50 kilobytes.

Debugger 50 may include other features to monitor a communication session to collect debug information. As an example, debugger 50 may include a trace module, a process thread, a trace interface, a trace buffer, and a trace file. A trace module manages the processing of trace messages. A process thread uses trace interfaces to process trace messages. A trace buffer stores trace messages received from a process thread. A trace file stores trace messages transferred from the trace buffer.

Modifications, additions, or omissions may be made to debugger 50 without departing from the scope of the invention. The components of debugger 50 may be integrated or separated according to particular needs. Moreover, the operations of debugger 50 may be performed by more, fewer, or other modules. Additionally, operations of debugger 50 may be performed using any suitable logic.

FIG. 3 is a flowchart illustrating one embodiment of a method for collecting debug information that may be used with the debugger of FIG. 2. According to the embodiment, debug information may be collected by marking specific call control data. The communication session may be monitored until the communication session is designated as satisfactory according to user-driven conditions resulting from user actions. Only certain marked control data may be logged as debug information.

The method begins at step 110, where system 10 facilitates a communication session for endpoints 20. Endpoints 20 may be involved in a conference call managed by a conference bridge. Debugger 50 monitors user-driven conditions of the communication session at step 114. The user-driven conditions may be monitored for each endpoint 20. A user-driven condition may include, for example, a call duration between the initiation of a communication session by a user and the termination of the communication session by the user.

Control data is marked during the monitoring at step 118. Control data may include, for example, state information, signaling information, routing information, other information, or any combination of the preceding. The call may be designated as satisfactory for an endpoint 20 at step 122. As an example, a communication session may be designated as satisfactory if the duration of the communication session is greater than a predetermined threshold.

If the call is designated as satisfactory for an endpoint 20 at step 122, the method proceeds to step 126, where monitoring of the communication session for the endpoint 20 is ceased. Monitoring of the other endpoints 20, however, may continue. After ceasing monitoring, the method terminates.

If the communication session for an endpoint 20 is not satisfactory at step 122, the method proceeds to step 130. Debugger 50 selects certain marked control data at step 130. The data may be selected in any suitable manner. As an example, the data may be selected according to the stage of the communication session. For example, if the communication session is at an initialization stage, signaling information, state information, and routing information may be selected. If the communication session is at a stable stage, stage information and routing information may be selected.

The selected control data is written to a trace log at step 134. The debug information in the trace log may be used to detect and analyze problems with a communication session. After writing the selected control data to the trace log, the method terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a communication session is monitored until the communication session is designated as satisfactory. Monitoring a communication session until it is designated as satisfactory may reduce collection of uninformative debug information collected while increasing collection of informative debug information.

Another technical advantage of one embodiment may be that the debug information is collected by marking specific call control data. Call control data is collected for every communication session for call control purposes, so collecting debug information from the call control data does not involve collecting additional data for debug purposes.

Another technical advantage of one embodiment may be that a communication session may be designated as satisfactory according to user-driven conditions resulting from user actions. Since the user is an effective judge of the quality of a communication session, user-driven conditions may better reflect the quality of a communication session.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for collecting debug information, comprising:
   facilitating a communication session for an endpoint operated by a user;
   monitoring one or more user-driven conditions, a user-driven condition resulting from the user:
      continuing participation in the communication session beyond a set duration thereby indicating that the communication session is satisfactory according to the user; or
      terminating participation in the communication session before the set duration thereby indicating the communication session is unsatisfactory according to the user;
   gathering data during the monitoring;
   determining from the one or more user-driven conditions whether the communication session is satisfactory or unsatisfactory according to the user;
   discontinuing monitoring if the user continues participation in the communication session beyond the set duration; and
   continuing the communication session to generate debug information from the gathered data if the user terminates participation in the communication session before the set duration, comprising:
      selecting a portion of the gathered data according to a stage of the communication session, the selected portion comprising a first type of information if the participation was terminated during an initialization stage and a second type of information if the participation was terminated at a stable stage; and
      writing the selected portion of the gathered data to a trace log.

2. The method of claim 1, wherein gathering data during the monitoring further comprises:
   marking call control data to yield the gathered data comprising the marked call control data.

3. The method of claim 1, wherein continuing the communication session to generate debug information from the gathered data if the user terminates participation in the communication session before the set duration further comprises:
   selecting a portion of the gathered data according to diagnostic information; and
   writing the selected portion of the gathered data to a trace log.

4. The method of claim 1, wherein continuing the communication session to generate debug information from the gathered data if the user terminates participation in the communication session before the set duration further comprises:
   selecting a portion of the gathered data according to a stage of the communication session; and
   writing the selected portion of the gathered data to a trace log.

5. The method of claim 1, wherein continuing the communication session to generate debug information from the gathered data if the user terminates participation in the communication session before the set duration further comprises:
   establishing that the communication session is at an initialization stage; and selecting at least one of the gathered data:
   signaling information;
   state information; and
   routing information.
6. The method of claim 1, wherein continuing the communication session to generate debug information from the gathered data if the user terminates participation in the communication session before the set duration further comprises:
   establishing that the communication session is at a stable stage; and
   selecting at least one of the gathered data:
      packet statistics; and
      memory usage.
7. A system for collecting debug information, comprising:
   an interface operable to:
      facilitate a communication session for an endpoint operated by a user; and
   a processor coupled to the interface and operable to:
      monitor one or more user-driven conditions, a user-driven condition resulting from the user:
         continuing participation in the communication session beyond a set duration thereby indicating that the communication session is satisfactory according to the user; or
         terminating participation in the communication session before the set duration thereby indicating the communication session is unsatisfactory according to the user;
      gather data during the monitoring;
      determine from the one or more user-driven conditions whether the communication session is satisfactory or unsatisfactory according to the user;
      discontinue monitoring if the user continues participation in the communication session beyond the set duration; and
      continue the communication session to generate debug information from the gathered data if the user terminates participation in the communication session before the set duration, comprising:
         selecting a portion of the gathered data according to a stage of the communication session, the selected portion comprising a first type of information if the participation was terminated during an initialization stage and a second type of information if the participation was terminated at a stable stage; and
         writing the selected portion of the gathered data to a trace log.
8. The system of claim 7, the processor further operable to gather data during the monitoring by:
   marking call control data to yield the gathered data comprising the marked call control data.
9. The system of claim 7, the processor further operable to generate debug information from the gathered data if the user terminates participation in the communication session before the set duration by:
   selecting a portion of the gathered data according to diagnostic information; and
   writing the selected portion of the gathered data to a trace log.
10. The system of claim 7, the processor further operable to generate debug information from the gathered data if the user terminates participation in the communication session before the set duration by:
   selecting a portion of the gathered data according to a stage of the communication session; and
   writing the selected portion of the gathered data to a trace log.
11. The system of claim 7, the processor further operable to generate debug information from the gathered data if the user terminates participation in the communication session before the set duration by:
   establishing that the communication session is at an initialization stage; and
   selecting at least one of the gathered data:
      signaling information;
      state information; and
      routing information.
12. The system of claim 7, the processor further operable to generate debug information from the gathered data if the user terminates participation in the communication session before the set duration by:
   establishing that the communication session is at a stable stage; and
   selecting at least one of the gathered data:
      packet statistics; and
      memory usage.
13. The system of claim 7, wherein:
   the processor is further operable to:
      gather data during the monitoring by:
         marking call control data to yield the gathered data comprising the marked call control data; and
      generate debug information from the gathered data if the user terminates participation in the communication session before the set duration by:
         selecting a first portion of the gathered data according to diagnostic information; and
         writing the selected first portion of the gathered data to a trace log;
         selecting a second portion of the gathered data according to a stage of the communication session;
         writing the selected second portion of the gathered data to a trace log;
         establishing that the communication session is at an initialization stage;
         selecting at least one of the gathered data:
            signaling information;
            state information; and
            routing information;
         establishing that the communication session is at a stable stage; and
         selecting at least one of the gathered data:
            packet statistics; and
            memory usage.
14. A conference bridge operable to collect debug information, comprising:
   a processor operable to:
      facilitate a communication session for a plurality of endpoints, an endpoint of the plurality of endpoints operated by a user; and
   a debugger coupled to the processor and operable to perform the following for each endpoint of the plurality of endpoints:
      monitor one or more user-driven conditions for the each endpoint, a user-driven condition resulting from the user:
         continuing participation in the communication session beyond a set duration thereby indicating that the communication session is satisfactory according to the user; or
         terminating participation in the communication session before the set duration thereby indicating the communication session is unsatisfactory according to the user;

gather data during the monitoring;
determine from the one or more user-driven conditions whether the communication session is satisfactory or unsatisfactory according to the user;
discontinue monitoring if the user continues participation in the communication session beyond the set duration; and
continue the communication session to generate debug information from the gathered data if the user terminates participation in the communication session before the set duration, comprising:
selecting a portion of the gathered data according to a stage of the communication session, the selected portion comprising a first type of information if the participation was terminated during an initialization stage and a second type of information if the participation was terminated at a stable stage; and
writing the selected portion of the gathered data to a trace log.

15. The conference bridge of claim 14, the debugger further operable to gather data during the monitoring by:
marking call control data to yield the gathered data comprising the marked call control data.

16. The conference bridge of claim 14, the debugger further operable to generate debug information from the gathered data if the user terminates participation in the communication session before the set duration by:
selecting a portion of the gathered data according to diagnostic information; and
writing the selected portion of the gathered data to a trace log.

17. The conference bridge of claim 14, the debugger further operable to generate debug information from the gathered data if the user terminates participation in the communication session before the set duration by:
selecting a portion of the gathered data according to a stage of the communication session; and
writing the selected portion of the gathered data to a trace log.

18. The conference bridge of claim 14, the debugger further operable to generate debug information from the gathered data if the user terminates participation in the communication session before the set duration by:
establishing that the communication session is at an initialization stage; and
selecting at least one of the gathered data:
signaling information;
state information; and
routing information.

19. The conference bridge of claim 14, the debugger further operable to generate debug information from the gathered data if the user terminates participation in the communication session before the set duration by:
establishing that the communication session is at a stable stage; and
selecting at least one of the gathered data:
packet statistics; and
memory usage.

20. The conference bridge of claim 14, wherein:
the debugger is further operable to:
gather data during the monitoring by:
marking call control data to yield the gathered data comprising the marked call control data; and
generate debug information from the gathered data if the user terminates participation in the communication session before the set duration by:
selecting a first portion of the gathered data according to diagnostic information;
writing the selected first portion of the gathered data to a trace log;
selecting a second portion of the gathered data according to a stage of the communication session;
writing the selected second portion of the gathered data to a trace log;
establishing that the communication session is at an initialization stage;
selecting at least one of the gathered data:
signaling information;
state information; and
routing information;
establishing that the communication session is at a stable stage; and
selecting at least one of the gathered data:
packet statistics; and
memory usage.

21. A system for collecting debug information, comprising:
means for facilitating a communication session for an endpoint operated by a user;
means for monitoring one or more user-driven conditions, a user-driven condition resulting from the user:
continuing participation in the communication session beyond a set duration thereby indicating that the communication session is satisfactory according to the user; or
terminating participation in the communication session before the set duration thereby indicating the communication session is unsatisfactory according to the user;
means for gathering data during the monitoring;
means for determining from the one or more user-driven conditions whether the communication session is satisfactory or unsatisfactory according to the user;
means for discontinuing monitoring if the user continues participation in the communication session beyond the set duration; and
means for continuing the communication session to generate debug information from the gathered data if the user terminates participation in the communication session before the set duration, comprising:
selecting a portion of the gathered data according to a stage of the communication session, the selected portion comprising a first type of information if the participation was terminated during an initialization stage and a second type of information if the participation was terminated at a stable stage; and
writing the selected portion of the gathered data to a trace log.

* * * * *